United States Patent
Hudson et al.

(10) Patent No.: US 9,237,407 B2
(45) Date of Patent: Jan. 12, 2016

(54) HIGH QUALITY, CONTROLLED LATENCY MULTI-CHANNEL WIRELESS DIGITAL AUDIO DISTRIBUTION SYSTEM AND METHODS

(75) Inventors: Michael D. Hudson, Portland, OR (US); Kelly M. McArthur, Hillsboro, OR (US)

(73) Assignee: Summit Semiconductor, LLC, Beaverton, OR (US)

(*) Notice: Subject to any disclaimer, the term of this patent is extended or adjusted under 35 U.S.C. 154(b) by 417 days.

(21) Appl. No.: 11/499,405

(22) Filed: Aug. 4, 2006

(65) Prior Publication Data

US 2007/0058762 A1 Mar. 15, 2007

Related U.S. Application Data

(60) Provisional application No. 60/705,723, filed on Aug. 4, 2005, provisional application No. 60/705,724, filed on Aug. 4, 2005.

(51) Int. Cl.
| | |
|---|---|
| *H04J 11/00* | (2006.01) |
| *H04S 3/00* | (2006.01) |
| *H04H 20/28* | (2008.01) |
| *H04H 20/61* | (2008.01) |
| *H04H 20/89* | (2008.01) |
| *H04L 12/40* | (2006.01) |
| *H04L 12/28* | (2006.01) |

(52) U.S. Cl.
CPC ............. *H04S 3/008* (2013.01); *H04H 20/28* (2013.01); *H04H 20/61* (2013.01); *H04H 20/89* (2013.01); *H04L 12/40058* (2013.01); *H04L 2012/2841* (2013.01); *H04L 2012/2849* (2013.01)

(58) Field of Classification Search
USPC .......................... 370/503, 442, 336, 508, 512
See application file for complete search history.

(56) References Cited

U.S. PATENT DOCUMENTS

| | | |
|---|---|---|
| 5,463,646 A | 10/1995 | Dillon et al. |
| 6,278,784 B1 | 8/2001 | Ledemann |
| 6,684,060 B1 * | 1/2004 | Curtin ............................ 375/146 |
| 7,076,204 B2 * | 7/2006 | Richenstein et al. ......... 455/3.06 |
| 7,590,121 B2 * | 9/2009 | de Mier ......................... 370/394 |
| 2004/0223622 A1 * | 11/2004 | Lindemann et al. ............. 381/79 |
| 2005/0152397 A1 * | 7/2005 | Bai et al. ........................ 370/468 |
| 2005/0166135 A1 * | 7/2005 | Burke et al. ................. 715/500.1 |

* cited by examiner

*Primary Examiner* — Maharishi Khirodhar
(74) *Attorney, Agent, or Firm* — Chernoff, Vilhauer, McClung & Stenzel, LLP

(57) ABSTRACT

A multichannel wireless digital audio distribution system provides for the synchronization of the output of audio data by different receiving units set to output audio data for receiver unit assigned channels. The transmitter includes parallel data respectively representing a plurality of audio data channels in each data packet. The data packets are broadcast wirelessly with known, predetermined packets including a timing marker. Each receiver unit receives the broadcast data packets and selects the parallel data respectively representing the receiver unit assigned audio data channel. The receiver unit outputs the selected data synchronized to the receipt of the timing marker by the receiving unit.

6 Claims, 5 Drawing Sheets

HIGH QUALITY, CONTROLLED LATENCY MULTI-CHANNEL WIRELESS DIGITAL AUDIO DISTRIBUTION SYSTEM AND METHODS

CROSS-REFERENCE TO RELATED APPLICATIONS

This application claims the benefit of U.S. Provisional Application No(s). 60/705,723 and 60/705,724, all filed Aug. 4, 2005.

The present application is related to System and Methods for Aligning Capture and Playback Clocks in a Wireless Digital Audio Distribution System, Ser. No. 11/499,126, filed Aug. 4, 2006 and assigned to the Assignee of the present Application.

BACKGROUND OF THE INVENTION

1. Field of the Invention

The present invention is generally related to the wireless distribution of high-quality audio signals and, in particular to a system and methods of distributing high-bitrate, multichannel, audio wirelessly while maintaining a constant, low, playback to source latency and channel to channel phase coherency.

2. Description of the Related Art

In the audio space there are many places that latency, high quality, and more than two channels are critical to the quality of the experience. It is also difficult to retrofit standard spaces with cables to the support multiple channels of audio. Today's definition of high end audio in the Home Theater space is 7 channels of audio samples at 48,000 samples per second with 24 bits of data per sample. Further, the marketplace is rapidly maturing from 5.1 (6 channel) to 11.1 (12 channel) sound system requirements.

Conventional wireless solutions rely on simple, low-cost radio technologies, such as frequency modulation (FM) and basic spread spectrum modulation schemes. The consequence of this is a reduction in the number of bits used for each audio sample, with a corresponding reduction in dynamic range and audio quality.

A critical requirement exists in both spaces to minimize and establish a constant or fixed latency in the system and to keep all channels aligned in time. Latency refers to time delays measured from audio source-to-output and from channel-to-channel. Source-to-output delays are a problem for all sound venues including, in particular, Home Theater and other video/audio systems, where the audio program material is synchronized to a video screen ("lip-sync"). Acoustics engineers generally consider source-to-output delays greater than 10 milliseconds to be noticeable. As for latency from channel-to-channel, the human ear is extremely sensitive to these phase delays and experts describe audio delivered with channel-to-channel delays greater than 1 millisecond as sounding "disjointed" or "blurry".

The same data and sampling rate are in use in recording and sound reinforcement, only the desired number of channels is generally between 8 and 32. In conferencing use, the latency and wireless requirement are compounded by a need for accurate routing of audio paths with intelligent addition of signals and echo cancellation.

Consequently, there is a clear need to solve all of these problems in a wireless audio distribution system.

SUMMARY OF THE INVENTION

Thus, a general purpose of the present invention is to provide an efficient wireless, high-bitrate, multichannel, audio system capable of maintaining constant, low, playback to source latency while further maintaining channel to channel phase coherency.

This is achieved in the present invention by providing a multichannel wireless digital audio distribution system that enables the synchronization of the output of audio data by different receiving units set to output audio data for receiver unit assigned channels. The transmitter includes parallel data respectively representing a plurality of audio data channels in each data packet. The data packets are broadcast wirelessly with predetermined packets including a timing marker. Each receiver unit receives the broadcast data packets and selects the parallel data respectively representing the receiver unit assigned audio data channel. The receiver unit outputs the selected data synchronized to the receipt of the timing marker by said receiving unit.

An advantage of the present invention is base configurations are immediately capable of distributing 16 channels of audio with a full 24 bits per sample and 48,000 samples per second.

Another advantage of the present invention is the initial preferred embodiments are capable of achieving a fixed, repeatable inter-channel differential latency of less than 0.001 millisecond and a fixed, repeatable source to speaker latency of less than 2 milliseconds.

A further advantage of the present invention is that it enables multichannel audio sources to be placed "out-of-view", while supporting a full complement of audio speakers to be installed throughout a room without wires. Costly physical rewiring is not required.

Still another advantage of the present invention is that the audio playback delays can be precisely adjusted and maintained in fixed relation to "tune" audio phasing for specific listener/speaker positions and room acoustics.

Yet another advantage of the present invention is that the transmitters and receivers, as implemented in the preferred embodiments, can and will coexist with present wireless networking systems without introducing interference, without loss of audio fidelity, and while meeting all FCC and CSA certification requirements.

DETAILED DESCRIPTION OF THE INVENTION

The present invention provides for the packet transmission of audio data from a transmitter, typically coupled to a multiple channel audio data source, to a set of wireless packet data receivers. The receivers are programmable to associate operation with an assigned transmitter. The receivers are further programmable to select and decode a specified channel or channels of the transmitted multiple channel content. In preferred configuration, a separate receiver is provided for each audio reproduction speaker in a sound system and, dependent on the speaker type and placement, selects and decodes a corresponding channel of the audio content. Receivers associated with the center channel, base, various left and right side and rear effects speakers each preferably decode respective audio content channels provided through the transmitter for respective speakers.

The transmitters and receivers of the present invention preferably support both digital or analog format inputs and outputs for audio data. In particular, the receivers of the present invention provide may be integrated into the speaker enclosures and closely integrated with the speaker amplification system. That is, wireless transmission of audio content while maintaining high audio fidelity enables audio component manufacturers to locate and isolate speaker amplifiers internal to the speaker enclosures. This removes the "hot and heavy" power sources and amplifiers from audio source appliances. Migration of these components out to the speakers themselves enables manufactures to fully implement modern digital switching amplifier topologies, including specifically Class D amplifier designs, in the speakers. This will enable fundamental improvements in sound reproduction while achieving reduced size, cost, power consumption, and EMI radiation in all system components. Users also gain the advantages of flexible installation and reconfiguration.

The transmitters and receivers used in the preferred embodiments are preferably based on the high-volume commodity radio components used in conventional wireless networking systems, such as IEEE 802.11g and 802.11n. For purposes of implementation, the present invention provides for the replacement of the conventional Media Access Control (MAC) layer with a data processing engine specifically designed to deliver high-bitrate isochronous data, such as audio and video, with low latency in accordance with the present invention. Clock capture and alignment by the data processing engine of the present invention is further described in the co-pending application, System and Methods for Aligning Capture and Playback Clocks in a Wireless Digital Audio Distribution System, Ser. No. 11/499,126 filed concurrently herewith, assigned to the assignee of the present invention, which is hereby incorporated by reference.

Figure 1:
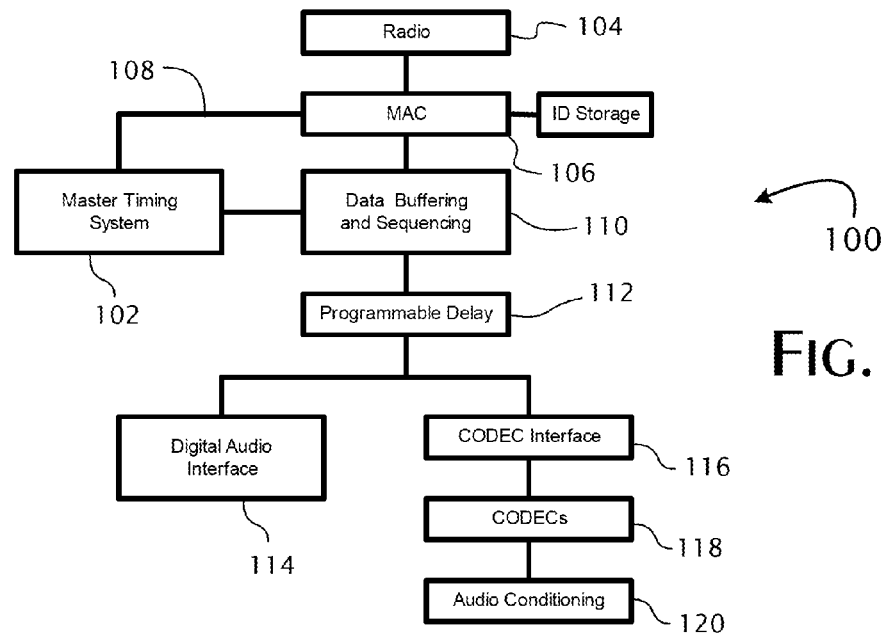
FIG. 1 provides a block diagram of a preferred architecture of a multi-channel audio transmitter constructed in accordance with the present invention.

The system and methods of the present invention implements a basic architecture and manner of operation that allows use in multiple ways. All uses are generally based on the same elements. The use determines the operation and data flow of these elements. The preferred general architecture 100 of the present invention is shown in FIG. 1.

The Master Timing System 102 contains a very accurate millisecond level interval generator. The millisecond intervals are derived from the master CODEC (CODer/DECoder) sampling clock and this interval is distributed to the slave devices through radio signaling. The slave devices will use this to synchronize their CODEC playback clocks.

The radio 104 and MAC (Media Access Controller) 106 sections are used to control the radio and transfer the data. The data clock is independent of the Master Timing System and is part of the overall radio design. The Internal Alignment Marker input 108 to the MAC from the Master Timing System is used to synchronize the sending of data blocks marked as Marker Sample Blocks. The Sample Block Markers on the receiver will be generated based on the timing of these packets.

The Data Buffering and Sequencing block 110 manages taking the many data streams and either encoding them for sending as data blocks or decoding the received blocks and returning the data as one or more of the many data streams.

The programmable delay block 112 is used in the receivers to allow for time alignment of the speakers in the system. It is not used to adjust for transmission delays but rather for listener to speaker distance adjustment for acoustics.

Figure 2:
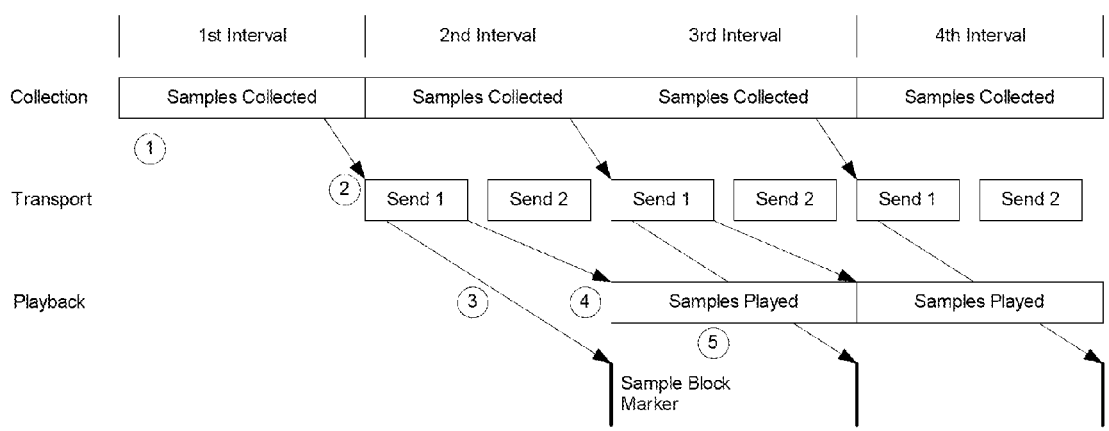
FIG. 2 is a flow diagram illustrating the pipeline processing of data through a wireless transmitter and receiver in accordance with a preferred embodiment of the present invention.

The Digital Audio and CODEC Interfaces 114, 116 provide the different ways the audio can be received from or sent to outside systems for use. The diagram shown in FIG. 2 illustrates the method of transmission used by a master transmitter with receipt and playback through a slave receiver. The following section describes operation at the corresponding stages illustrated in FIG. 2.

1) At step 1, samples are collected from the Digital Audio or CODECS Interfaces 114, 116, 118, 120 into a Sample Block Buffer. The data in the Sample Block Buffer is preferably processed to implement data redundancy injection for Forward Error Correction (FEC) and organized into a Send Buffer (Send 1).

2) The contents of the Sample Block Buffer (Send 1) is transmitted over the radio link as a packet at step 2. The Sample Block may be sent more than once (Send 2) to provide data redundancy. The first Sample Block sent per interval, as shown, in this mode of operation will have its Sample Block Marker bits set.

3) When the receiver radio and MAC 104, 106 decode a valid Sample Block with the Marker bits set, the MAC 106 will trigger a Sample Block Marker, step 3, at a delay determined during the initialization of the radio link. The delay will provide a Sample Block Marker at Sample Block boundaries.

4) The Sample Block is played, step 4, starting at the Sample Block Marker generated in step 3. The received Data Buffer is processed through a convolutional decoder and the resulting data is checked and repaired by use of the FEC methods employed and is returned to being a Sample Block that can the be sequenced for playing.

5) The entire Sample Block is sequenced out at step 5. The three phases of collection, transport, and playback are pipelined such that every step is running simultaneously.

The method achieves a fixed latency using asynchronous packets by using the first packet or Sample Block to generate a calibrated Sample Block Marker to show the boundary of the playback Block.

When the receiver detects the first send of the data block a timing chain is activated to generate the Interval Alignment Marker. The multiple sends and the error detection and correction codes embedded in the sent data are used to ensure that the data is received correctly. If there is an error in the received data an internal Interval Alignment Marker is not generated and through either data repetition or interpolation a block of 48 samples are supplied to the CODEC buffers for playback.

Data security and quality is achieved by sending the collected data multiple times in the transport period or through the embedding of error correction and detection codes with the data streams in the Sample Block.

In use, the present invention can be implemented in multiple different configurations. Two exemplary embodiments, illustrating different configuration options, are presented as examples.

Figure 3:
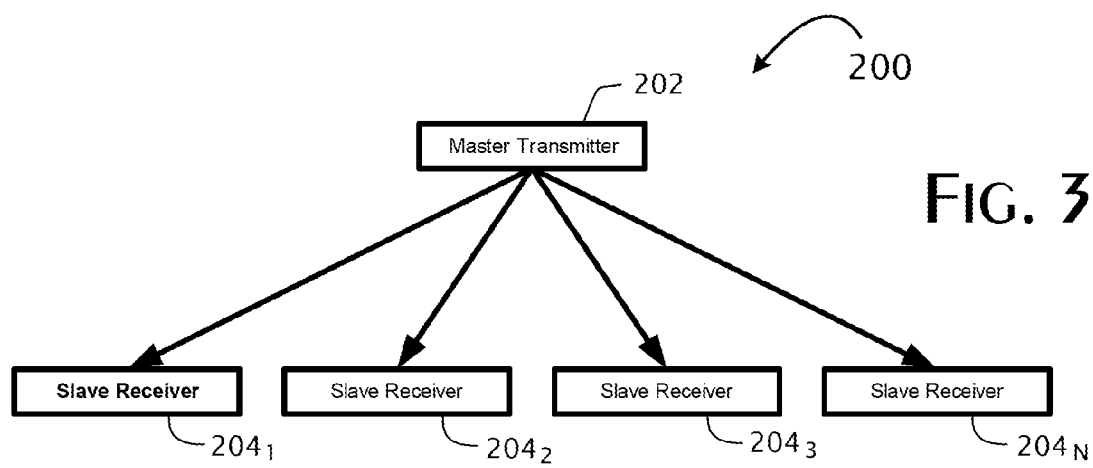
FIG. 3 is a block diagram of a source transmitter-based wireless audio packet distribution timing control configuration constructed in accordance with a preferred embodiment of the present invention.
Figure 4:
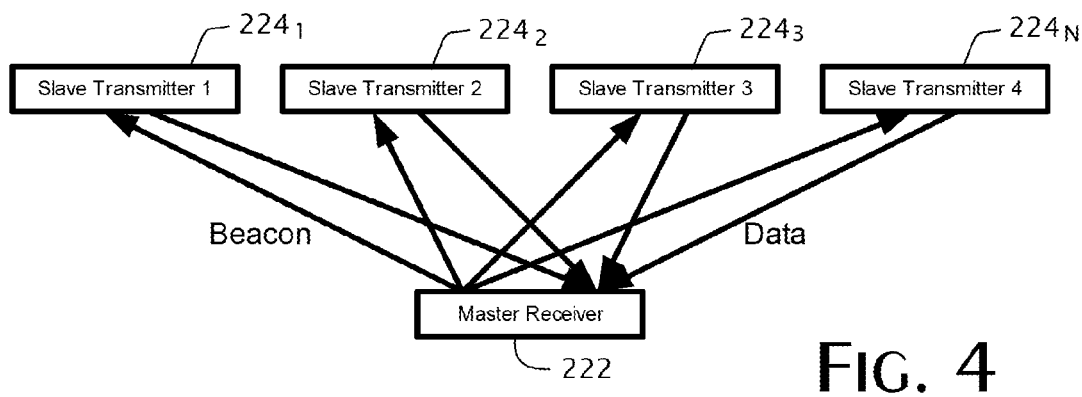
FIG. 4 is a block diagram of a receiver-based timing control configuration for the timing controlled distribution of wireless audio packets in accordance with a preferred embodiment of the present invention.

1) FIG. 3 illustrates the timing control flow 200 for a configuration as a single transmitter 202 acting as a timing master to a single slave or multiple slave receivers $204_{1-n}$.
2) FIG. 4 illustrates the timing control flow 220 for a configuration as a single receiver 222 acting as a timing master to a single or multiple slaved transmitters $224_{1-n}$.

Figure 5:
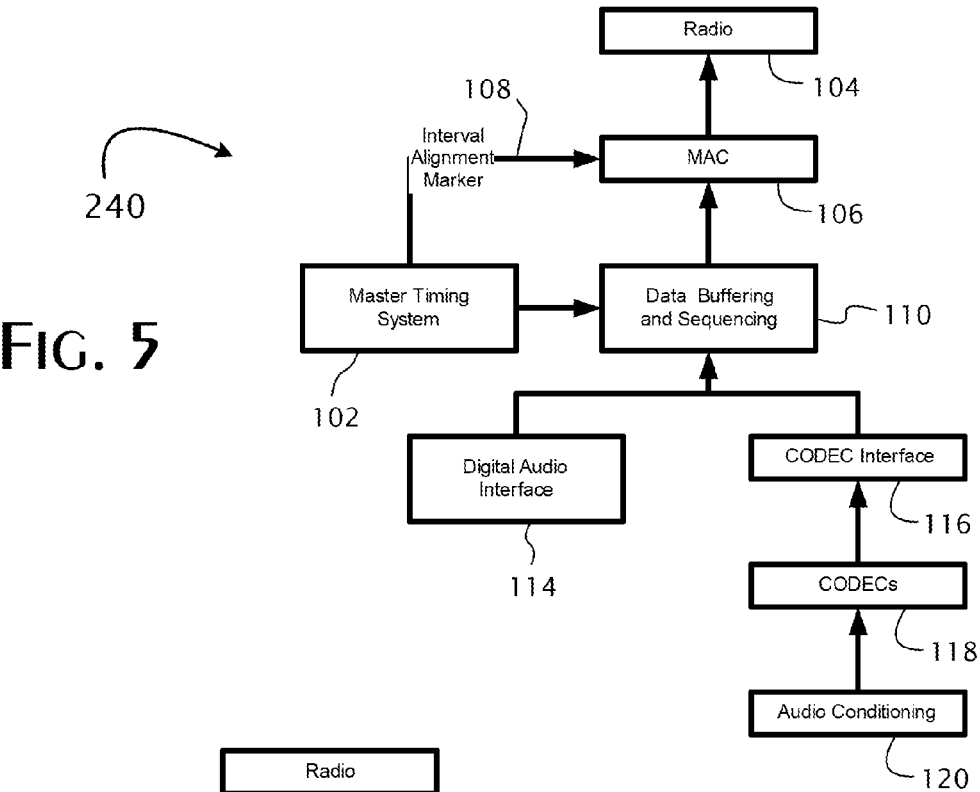
FIG. 5 is a block diagram of a preferred architecture of a multichannel wireless audio packet transmitter constructed in accordance with a preferred embodiment of the present invention.

A preferred implementation of the single master transmitter configuration controller embodiment is shown in FIG. 5. As shown, the timing, data buffering, and sequencing are driven by the Master Timing System 102. The MAC will send the first data packet at a preset delay relative to the Sample Block Marker. The MAC will not set the Sample Block Marker bit on subsequent redundant sends of the data packet.

Figure 6:
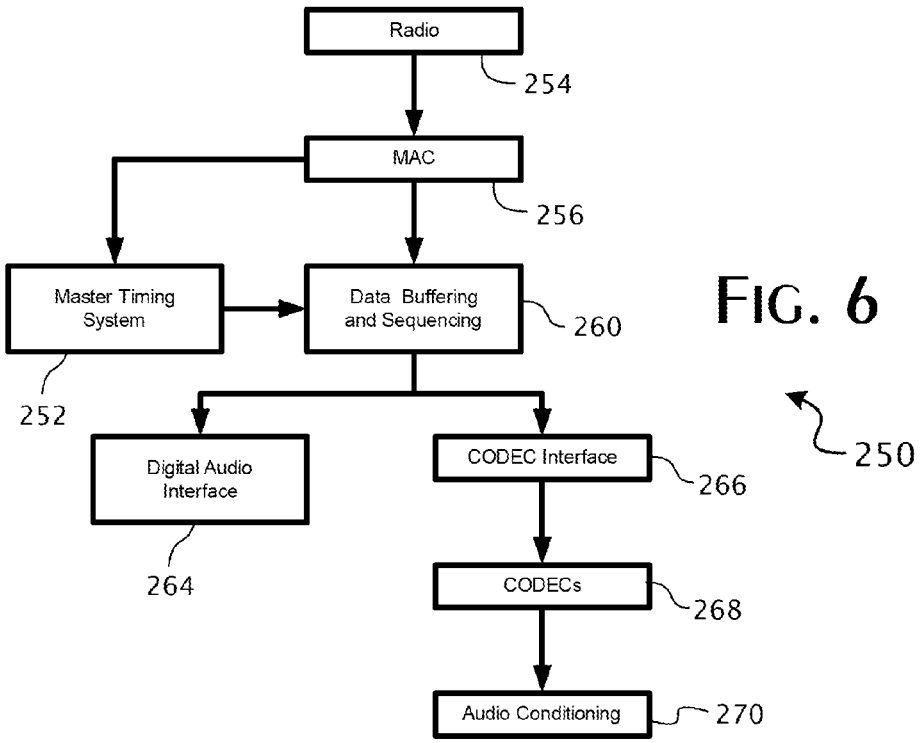
FIG. 6 is a block diagram of a preferred architecture of a multichannel discriminating wireless audio packet receiver constructed in accordance with a preferred embodiment of the present invention.

A preferred implementation 250 of the slave receiver is shown in FIG. 6. The slave receiver detects the Sample Block Marker bit in the received data packet and a timing chain is activated to generate the Sample Block Marker for use in the data buffering and sequencing of the received data. Redundant data is discarded after a valid packet is received.

Figure 7:
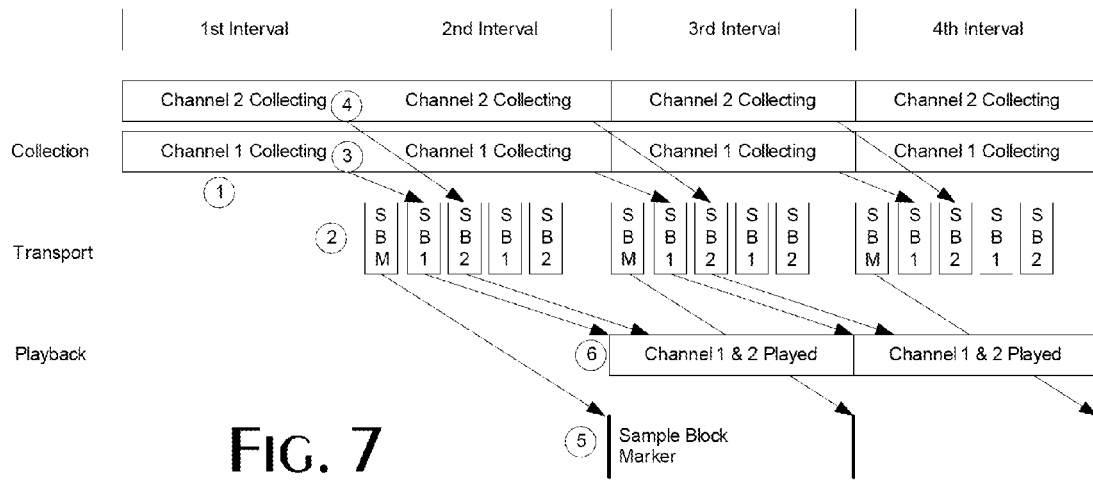
FIG. 7 is a flow diagram illustrating the pipeline processing of data through a wireless transmitter and receiver in accordance with a receiver-based timing control configuration of a preferred embodiment of the present invention.

For the preferred implementation of a single receiver as a timing master to one or more slaved transmitters, the preferred timing control flow is changed relative to that shown in FIG. 2. As shown in FIG. 7, the preferred timing control flow 220 for the receiver timing master embodiment allows for the aligning of the timing in all the transmitters to match the receiver that acts as the timing master. The following describes operation at the corresponding stages illustrated in FIG. 7.

1) All channels collect their data stream for an interval's duration. While FIG. 7 illustrates collection for two channels, the present invention contemplates collection and operation on data for 1 to N channels, with N being from 8 to 16 in the preferred embodiments of the present invention.
2) A Sample Block Marker (SBM) packet is signaled over the radio link from the Master Receiver to the Slave Transmitter(s).
3) The transmitting device containing channel 1 waits a specified interval after the SBM signal has been removed and then transmits its Sample Block (SB1) to the Master Receiver.
4) The transmitting device containing channel 2 waits a specified interval after the previous Sample Block has been sent and then transmits its Sample Block (SB2) to the Master Receiver. The channel Block signaling continues as in step 3 & 4 until all the transmitting channels have sent their Blocks. The data is saved in the Slave Transmitter's MAC and repeated when the time for redundant signaling has come.
5) A Sample Block Marker is generated in the Slave Transmitter to align the Sample Block Collection start timing to the Master Receiver playback timing during each cycle.

Figure 8:
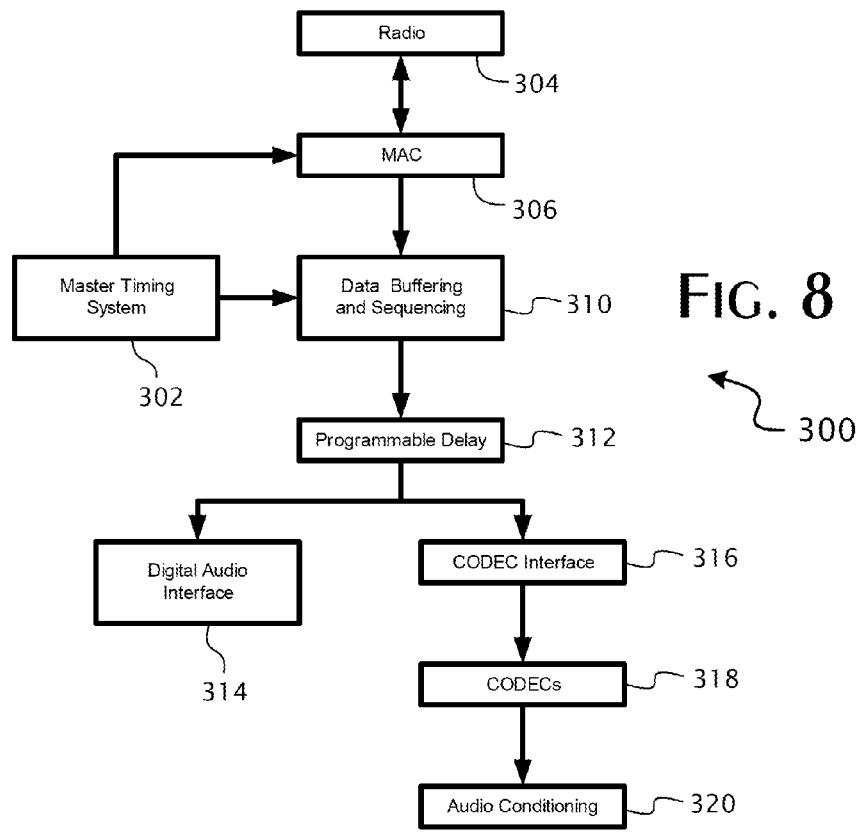
FIG. 8 is a block diagram of a preferred architecture of a multichannel discriminating wireless audio packet receiver supporting receiver-based timing control as constructed in accordance with a preferred embodiment of the present invention.

A preferred implementation of a master receiver 300, as used in the receiving timing master embodiment 220, is shown in FIG. 8. As shown, the master receiver 300 sends the sample block markers to the slave transmitters but receives data sent round robin from the slave transmitters. All slave transmitters receive the sample block marker packet sent from the master receiver and slave their sampling clocks to that timing. This is one case where a receiver transmits information, though only the signaling information necessary to align all the sampling timing in the slave transmitters.

Figure 9:
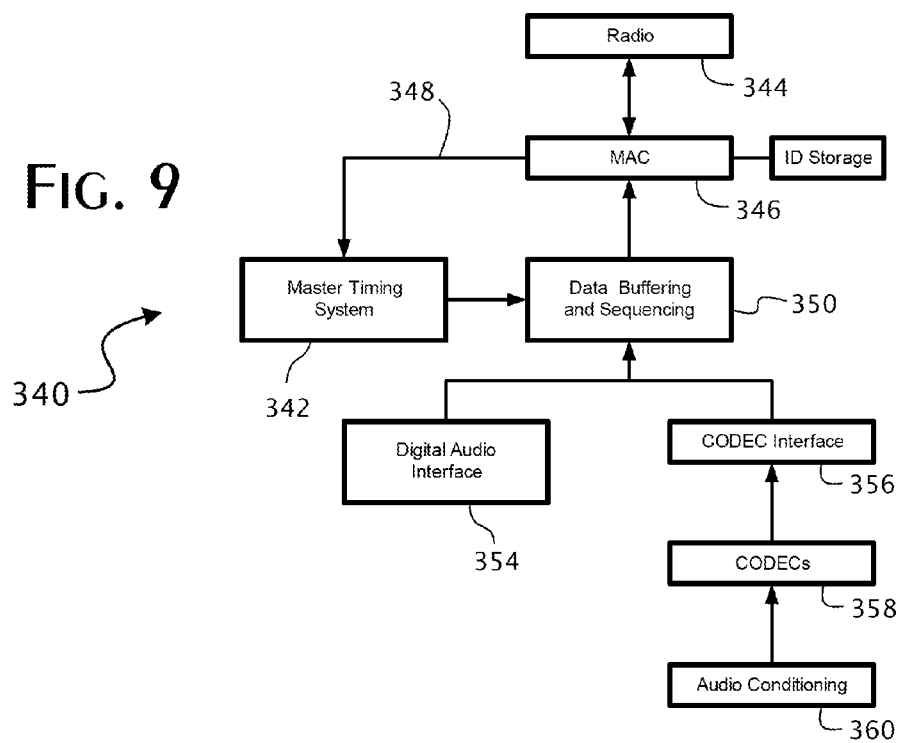
FIG. 9 is a block diagram of a preferred architecture of a multichannel wireless audio packet transmitter supporting receiver-based timing control as constructed in accordance with a preferred embodiment of the present invention.

A preferred implementation of the slave transmitter 340, as used in the receiving timing master embodiment 220, is shown in FIG. 9. The slave transmitter 340, as shown, receives a sample block marker packet from the master receiver and uses that to align its master timing system to that of the one or more master receivers. During system initialization the channel number and therefore the transmission order are determined and set for each of the slave transmitters.

Thus, a system and methods for providing for the distribution of high-bitrate, multichannel, audio wirelessly while maintaining a constant, low, playback to source latency and channel to channel phase coherency operable in multiple configurations has been described.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of operating a wireless digital audio distribution system to synchronize an output of audio data by receiving units, wherein a transmitting unit provides for a wireless packet transmission of audio data for receipt by a plurality of receiving units, said method comprising the steps of:

a) generating a sequence of audio data packets wherein each said data packet includes parallel data respectively representing a plurality of audio data channels;
b) broadcasting wirelessly, by said transmitter unit, said sequence of audio data packets, wherein said transmitter unit includes a timing marker in first predetermined ones of said audio data packets;
c) receiving wirelessly, by a predetermined one of said plurality of receiving units, said sequence of audio data packets;
d) selecting, from a second predetermined one of said audio data packets, parallel data respectively representing a predetermined one of said plurality of audio data channels;
e) outputting, said parallel data respectively representing a predetermined one of said plurality of audio data channels synchronized to a receipt of said timing marker by said receiving unit;
f) detecting, by said predetermined one of said plurality of receiving units, a transmission data error in a predetermined one of said first predetermined ones of said audio data packets; and
g) correcting said transmission data error including selection of a predetermined one of said redundantly broadcast audio data packets in replacement of said predetermined one of said first predetermined ones of said audio data packets; and wherein said step of correcting includes successively performing correction by:

h) first correcting said transmission data error using forward error correction to correct errors in the audio data transferred by said predetermined one of said first predetermined ones of said audio data packets;

i) second correcting said transmission data error, where said step of first correcting fails, by replacement of said predetermined one of said audio data packets; and j) third correcting said transmission data error, where said step of second correcting fails, by interpolation using the audio data transferred by a select one of said sequence of audio data packets to construct substitute audio data in replacement for the audio data transferred by said predetermined one of said first predetermined ones of said audio data packets, wherein said select one of said sequence of audio data packets is received by said predetermined one of said plurality of receiving units prior to said predetermined one of said first predetermined ones of said audio data packets.

2. A wireless digital audio distribution system providing for high-bitrate, multichannel distribution of digital audio data streams with controlled, low playback to source latency and channel to channel phase coherency, said wireless digital audio distribution system comprising:

a) a wireless transmitter, coupleable to a multichannel audio stream source, said wireless transmitter including
   i) an encoding packet data processor operative to generate a sequence of audio data packets wherein each said audio data packet encodes samples of a plurality of digital audio data streams as parallel data respectively representing said plurality of digital audio data streams, predetermined ones of said sequence of audio data packets being encoded with a timing marker; and
   ii) a radio transmitter coupled to said encoding packet data processor to transmit wirelessly said sequence of audio data packets; and b) a plurality of wireless receivers, coupleable to a respective plurality of audio speakers, each said wireless receiver including
   i) a radio receiver operative to receive said sequence of audio data packets from said wireless transmitter; and
   ii) a decoding packet data processor, coupled to said radio receiver, said decoding packet data processor being operative to decode from each audio data packet of said sequence of audio data packets parallel data representing a predetermined one of said plurality of digital audio data streams to produce a sequential series of samples reproducing said predetermined one of said plurality of digital audio data streams, said decoding package data processor including a buffered output stage operative to output said sequential series of samples synchronized with said timing markers;

wherein (a) said encoding packet data processor includes a transmitter master timing system, wherein said transmitter master timing system is operative to provide a temporally controlled alignment signal determinative of the transmission rate of said predetermined ones of said sequence of audio data packets encoded with said timing marker;

wherein (b) each said decoding packet data processor includes a receiver master timing system responsive to receipt of said timing markers, and wherein said buffered output stage is responsive to said receiver master timing system to output said sequential series of samples synchronized to said timing markers with a predetermined time delay;

wherein (c) said encoding packet data processor is further operative to encode said samples of said plurality of digital audio data streams with forward error correction information and wherein said decoding packet data processor is further operative to decode and correct said sequential series of samples reproducing said predetermined one of said plurality of digital audio data streams;

wherein (d) said sequence of audio data packets includes primary and redundant samples of said plurality of digital audio data streams in said parallel data respectively representing said plurality of digital audio data streams, said decoding packet data processor being further operative to select between using primary and redundant samples reproducing said predetermined one of said plurality of digital audio data streams; and wherein (e) said decoding packet data processor, in response to transmission data errors, is further operative to c) first correct a transmission data error using forward error correction to correct errors in a predetermined primary sample included in said sequential series of samples reproducing said predetermined one of said plurality of digital audio data streams;

d) second correct said transmission data error, where said first correction fails, by substitution of a corresponding redundant sample included in said sequential series of samples reproducing said predetermined one of said plurality of digital audio data streams, said decoding packet data processor being operative to perform said first correct with respect to said corresponding redundant sample; and e) third correct said transmission data error, where said second correct fails, by interpolation using a known sample included in said sequential series of samples reproducing said predetermined one of said plurality of digital audio data streams to construct a substitute sample in replacement of said predetermined primary sample, wherein said known sample occurs before said predetermined primary sample in said sequential series of samples reproducing said predetermined one of said plurality of digital audio data streams.

3. The wireless digital audio distribution system of claim 2 wherein said redundant samples of said plurality of digital audio data streams are provided as parallel data respectively representing said plurality of digital audio data streams in redundant audio data packets interleaved in said sequence of audio data packets transmitted by said wireless transmitter said redundant audio data packets being excluded from said predetermined ones of said sequence of audio data packets encoded with said timing marker.

4. The wireless digital audio distribution system of claim 3 wherein said predetermined time delay is programmable.

5. A method of operating a wireless digital audio distribution system to synchronize an output of audio data by receiving units, wherein a transmitting unit provides for a wireless packet transmission of audio data for receipt by a plurality of receiving units, said method comprising the steps of:

a) generating a sequence of audio data packets wherein each said data packet includes parallel data respectively representing a plurality of audio data channels;

b) broadcasting wirelessly, by said transmitter unit, said sequence of audio data packets, wherein said transmitter unit includes a timing marker in first predetermined ones of said audio data packets;

c) receiving wirelessly, by a predetermined one of said plurality of receiving units, said sequence of audio data packets;

d) selecting, from a second predetermined one of said audio data packets, parallel data respectively representing a predetermined one of said plurality of audio data channels;

e) outputting, said parallel data respectively representing a predetermined one of said plurality of audio data channels synchronized to a receipt of said timing marker by said receiving unit;

f) detecting, by said predetermined one of said plurality of receiving units, a transmission data error in a predetermined one of said first predetermined ones of said audio data packets; and g) correcting said transmission data error including selection of a predetermined one of said redundantly broadcast audio data packets in replacement of said predetermined one of said first predetermined ones of said audio data packets, wherein correction is successively performing by:
   i) first correcting said transmission data error using forward error correction to correct errors in the audio data transferred by said predetermined one of said first predetermined ones of said audio data packets;
   ii) second correcting said transmission data error, where said step of first correcting fails, by replacement of said predetermined one of said audio data packets; and h) third correcting said transmission data error, where said step of second correcting fails, by interpolation using the audio data transferred by a select one of said sequence of audio data packets to construct substitute audio data in replacement for the audio data transferred by said predetermined one of said first predetermined ones of said audio data packets, wherein said select one of said sequence of audio data packets is received by said predetermined one of said plurality of receiving units prior to said predetermined one of said first predetermined ones of said audio data packets.

6. A wireless digital audio distribution system providing for high-bitrate, multichannel distribution of digital audio data streams with controlled, low playback to source latency and channel to channel phase coherency, said wireless digital audio distribution system comprising:

a) a wireless transmitter, coupleable to a multichannel audio stream source, said wireless transmitter including
   i) an encoding packet data processor operative to generate a sequence of audio data packets wherein each said audio data packet encodes samples of a plurality of digital audio data streams as parallel data respectively representing said plurality of digital audio data streams, predetermined ones of said sequence of audio data packets being encoded with a timing marker; and
   ii) a radio transmitter coupled to said encoding packet data processor to transmit wirelessly said sequence of audio data packets; and b) a plurality of wireless receivers, coupleable to a respective plurality of audio speakers, each said wireless receiver including
   i) a radio receiver operative to receive said sequence of audio data packets from said wireless transmitter; and
   ii) a decoding packet data processor, coupled to said radio receiver, said decoding packet data processor being operative to decode from each audio data packet of said sequence of audio data packets parallel data representing a predetermined one of said plurality of digital audio data streams to produce a sequential series of samples reproducing said predetermined one of said plurality of digital audio data streams, said decoding package data processor including a buffered output stage operative to output said sequential series of samples synchronized with said timing markers, wherein said encoding packet data processor includes a transmitter master timing system, wherein said transmitter master timing system is operative to provide a temporally controlled alignment signal determinative of the transmission rate of said predetermined ones of said sequence of audio data packets encoded with said timing marker, wherein each said decoding packet data processor includes a receiver master timing system responsive to receipt of said timing markers, and wherein said buffered output stage is responsive to said receiver master timing system to output said sequential series of samples synchronized to said timing markers with a predetermined time delay, wherein said encoding packet data processor is further operative to encode said samples of said plurality of digital audio data streams with forward error correction information and wherein said decoding packet data processor is further operative to decode and correct said sequential series of samples reproducing said predetermined one of said plurality of digital audio data streams, wherein said sequence of audio data packets includes primary and redundant samples of said plurality of digital audio data streams in said parallel data respectively representing said plurality of digital audio data streams, said decoding packet data processor being further operative to select between using primary and redundant samples reproducing said predetermined one of said plurality of digital audio data streams, and wherein said decoding packet data processor, in response to transmission data errors, is further operative to
   a) first correct a transmission data error using forward error correction to correct errors in a predetermined primary sample included in said sequential series of samples reproducing said predetermined one of said plurality of digital audio data streams;
   b) second correct said transmission data error, where said first correction fails, by substitution of a corresponding redundant sample included in said sequential series of samples reproducing said predetermined one of said plurality of digital audio data streams, said decoding packet data processor being operative to perform said first correct with respect to said corresponding redundant sample; and
   c) third correct said transmission data error, where said second correct fails, by interpolation using a known sample included in said sequential series of samples reproducing said predetermined one of said plurality of digital audio data streams to construct a substitute sample in replacement of said predetermined primary sample, wherein said known sample occurs before said predetermined primary sample in said sequential series of samples reproducing said predetermined one of said plurality of digital audio data streams.

* * * * *